United States Patent
Cho et al.

(10) Patent No.: US 10,640,640 B2
(45) Date of Patent: May 5, 2020

(54) LOW VISCOSITY LIQUID EPOXY RESIN COMPOSITION AND PRESSURE VESSELS MANUFACTURED USING THE SAME

(71) Applicant: TORAY ADVANCED MATERIALS KOREA INC., Gyeongsangbuk-do (KR)

(72) Inventors: Jae-Pil Cho, Gyeongsangbuk-do (KR); Soo-Hyeong Park, Gyeongsangbuk-do (KR); Yoen-Ung Bae, Gyeongsangbuk-do (KR); Woo-Seok Kim, Gyeongsangbuk-do (KR)

(73) Assignee: TORAY ADVANCED MATERIALS KOREA INC., Gyeongsan, Gbuk-Do (KR)

( * ) Notice: Subject to any disclaimer, the term of this patent is extended or adjusted under 35 U.S.C. 154(b) by 0 days.

(21) Appl. No.: 15/526,227

(22) PCT Filed: Jan. 27, 2016

(86) PCT No.: PCT/KR2016/000881
§ 371 (c)(1),
(2) Date: May 11, 2017

(87) PCT Pub. No.: WO2017/104891
PCT Pub. Date: Jun. 22, 2017

(65) Prior Publication Data
US 2017/0327684 A1    Nov. 16, 2017

(30) Foreign Application Priority Data

Dec. 15, 2015   (KR) .................. 10-2015-0179510

(51) Int. Cl.
| | | |
|---|---|---|
| *C08L 63/00* | (2006.01) | |
| *C08K 5/17* | (2006.01) | |
| *C08K 7/02* | (2006.01) | |
| *F17C 1/00* | (2006.01) | |
| *C08K 5/00* | (2006.01) | |
| *C08K 7/14* | (2006.01) | |
| *C08K 7/06* | (2006.01) | |

(52) U.S. Cl.
CPC ............ *C08L 63/00* (2013.01); *C08K 5/0025* (2013.01); *C08K 5/17* (2013.01); *C08K 7/02* (2013.01); *F17C 1/00* (2013.01); *C08K 7/06* (2013.01); *C08K 7/14* (2013.01)

(58) Field of Classification Search
CPC ........................................ C08L 63/00
See application file for complete search history.

(56) References Cited

U.S. PATENT DOCUMENTS

| | | | | |
|---|---|---|---|---|
| 2008/0264551 A1* | 10/2008 | Wood | .................... | B29C 70/443 156/172 |
| 2010/0292415 A1* | 11/2010 | Reynolds | ............... | C08G 59/24 525/533 |
| 2012/0172493 A1* | 7/2012 | Dettloff | ................ | C08G 59/621 523/427 |
| 2012/0283405 A1* | 11/2012 | Klein | ....................... | C09D 7/63 528/68 |
| 2013/0140811 A1* | 6/2013 | Fahrer | .................... | F16L 13/103 285/285.1 |
| 2014/0114022 A1* | 4/2014 | Dettloff | ................ | C08G 59/226 525/113 |
| 2014/0171551 A1* | 6/2014 | Patel | ...................... | C08G 59/50 523/447 |
| 2014/0305951 A1* | 10/2014 | Griffith | ..................... | F17C 1/00 220/581 |
| 2017/0335147 A1* | 11/2017 | Lutz | ......................... | C08L 75/00 |
| 2019/0100616 A1* | 4/2019 | Zhou | .......................... | C08J 5/04 |

FOREIGN PATENT DOCUMENTS

| | | | | |
|---|---|---|---|---|
| JP | 2013-001767 | 1/2013 | ............ | C08G 59/20 |
| JP | 2015-078302 | 4/2015 | ............ | C08J 5/04 |
| KR | 10-1998-0701932 | 6/1998 | ............ | B29D 22/00 |
| KR | 10-2010-0113555 | 10/2010 | ............ | C08G 59/18 |
| KR | 10-2014-0118217 | 10/2014 | ............ | C08G 59/18 |
| KR | 10-1462449 | 11/2014 | ............ | C08G 59/18 |

OTHER PUBLICATIONS

International Search Report (ISR) dated Aug. 24, 2016 in PCT/KR2016/000881. (No English translation is available at this time).
Written Opinion (WO) dated Aug. 24, 2016 in PCT/KR2016/000881. (No English translation is available at this time).
Notification of Transmittal of Translation of the International Preliminary Report on Patentability of International Application No. PCT/KR2016/000881 dated Jun. 19, 2018.

* cited by examiner

*Primary Examiner* — Megan McCulley
(74) *Attorney, Agent, or Firm* — Harness, Dickey & Pierce, P.L.C.

(57) ABSTRACT

The present invention relates to a low-viscosity liquid epoxy resin composition and a pressure vessel manufactured using the same, and, more particularly, to a low-viscosity liquid epoxy resin composition, which has good workability due to low viscosity of the epoxy resin composition and exhibits both excellent elongation and an excellent glass transition temperature, and thus is applicable to pressure vessels for compressed natural gas and pressure vessels for compressed hydrogen gas, and a pressure vessel having excellent pressure-resistant characteristics manufactured using the same.

13 Claims, No Drawings

LOW VISCOSITY LIQUID EPOXY RESIN COMPOSITION AND PRESSURE VESSELS MANUFACTURED USING THE SAME

CROSS-REFERENCE TO RELATED APPLICATIONS

This application is a national phase application of PCT Application No. PCT/KR2016/000881, filed on 27 Jan. 2016, which claims benefit of Korean Patent Application 10-2015-0179510, filed on 15 Dec. 2015. The entire disclosure of the applications identified in this paragraph is incorporated herein by references.

FIELD

The present invention relates to a low-viscosity liquid epoxy resin composition and a pressure vessel manufactured using the same, and, more particularly, to a low-viscosity liquid epoxy resin composition, which has good workability due to low viscosity of the epoxy resin composition and exhibits both excellent elongation and an excellent glass transition temperature, and thus is applicable to pressure vessels for compressed natural gas and pressure vessels for compressed hydrogen gas, and a pressure vessel manufactured using the same.

BACKGROUND

In general, a pressure vessel has a structure configured to contain a fluid, for example, a liquid, a liquefied gas, a condensable gas, and a combination thereof under pressure. Such a pressure vessel includes pipes and other ducts (hydraulic lines, etc.) which may be used to raise a pressure to transfer a fluid, and structures (rocket motor casings, launch tubes, etc.) exposed to a transient elevated pressure, as well as storage vessels (fuel tanks, portable gas storage tanks, etc.).

Such a pressure vessel has been typically manufactured using a metal. However, a pressure vessel manufactured using a conventional metallic liner has problems in that it is heavy in weight and highly susceptible to corrosion, and also has high manufacturing costs.

To solve the above problems, pressure vessels in which reinforcing fibers such as carbon fibers or glass fibers are wound around or stacked on the outside of a plastic liner have been increasingly used. For example, Korean Unexamined Patent Publication No. 10-1998-701932 titled "Pressure Vessel and Method of Manufacturing the Same," discloses a pressure vessel including an inner liner having a gas barrier property and a pressure-resistant outer liner installed to cover the inner liner, and the outer liner is formed of FRP including reinforcing fibers and a resin and also has an tensile modulus of 35 GPa or more and a tensile strain at break of 1.5% or more.

A matrix resin is generally impregnated with the reinforcing fibers, and wound around or stacked on a plastic liner. Since the matrix resin serves to transfer stress applied to a pressure vessel to the reinforcing fibers, physical properties of the resin are also an important factor in designing the pressure vessel. In particular, since a pressure vessel for compressed hydrogen gas uses a higher charging/discharging pressure than other pressure vessels, the contraction and expansion of the pressure vessel are high during a charging/discharging cycle, and high heat is generated.

In this case, the matrix resin applied to the pressure vessel for compressed hydrogen gas requires high elongation and a high glass transition temperature. Therefore, there is an increasing demand for a matrix resin satisfying such requirements, a low-viscosity liquid epoxy resin composition including the matrix resin, and a pressure vessel manufactured using the same.

DISCLOSURE

Technical Problem

Therefore, the present invention is designed to solve the problems of the prior art, and it is an object of the present invention to provide a low-viscosity liquid epoxy resin composition, which exhibits both excellent elongation and an excellent glass transition temperature, and thus is applicable to pressure vessels for compressed natural gas and pressure vessels for compressed hydrogen gas, and a pressure vessel having excellent pressure-resistant characteristics manufactured using the same.

The foregoing and other objects and advantages of the present invention will become more apparent from the detailed description disclosing the following exemplary embodiments thereof.

Technical Solution

According to an aspect of the present invention, there is provided a low-viscosity liquid epoxy resin composition including a low-viscosity liquid epoxy resin and a curing agent mixture. Here, a cured product of the low-viscosity liquid epoxy resin composition has physical properties including both a glass transition temperature of 90° C. or higher, as obtained by thermal analysis using a differential scanning calorimeter (DSC), and an elongation of 2% or more, as obtained by evaluation according to ASTM D638.

Here, the curing agent mixture may be present at a content of 10 to 60 parts by weight, based on 100 parts by weight of the low-viscosity liquid epoxy resin.

Preferably, the low-viscosity liquid epoxy resin may include one or more selected from the group consisting of a bisphenol A-type epoxy, a bisphenol F-type epoxy, a novolac epoxy, a flame-retardant epoxy, a cyclic aliphatic epoxy, and a rubber-modified epoxy.

Preferably, the curing agent mixture may be an amine-based curing agent mixture comprising two or more selected from the group consisting of an aliphatic polyamine, a modified aliphatic polyamine, a cyclic amine, and a secondary or tertiary amine.

Preferably, the curing agent mixture may be a mixture of one or more aliphatic amines and one or more cyclic amines.

Preferably, the low-viscosity liquid epoxy resin composition may have a mixed viscosity of 1,500 cps or less.

Preferably, the cured product of the low-viscosity liquid epoxy resin composition may have a glass transition temperature of 90° C. to 150° C.

Preferably, the cured product of the low-viscosity liquid epoxy resin composition may have an elongation of 2% to 6%.

According to another aspect of the present invention, there is provided a pressure vessel manufactured using a composite material obtained by impregnating reinforcing fibers with the above-described low-viscosity liquid epoxy resin composition.

Preferably, the reinforcing fibers may include one or two or more selected from the group consisting of carbon fibers, glass fibers, aramid fibers, and metal fibers.

Here, the pressure vessel may have a burst pressure of 200 bar to 1,000 bar, a value of which satisfies a criterion for inspection under Notification No. 2013-562 of the Ministry of Land, Infrastructure and Transport.

Advantageous Effects

According to the present invention, there is an effect in which the low-viscosity liquid epoxy resin composition has low viscosity, high workability, etc.

Also, since the epoxy resin composition exhibiting both excellent elongation and an excellent glass transition temperature is applied to the pressure vessel, there is an effect of securing sufficient strength to cope with high pressure caused by a fluid, etc.

However, the effects of the present invention are not limited to the effects as described above, and other effects not disclosed herein will be clearly understood from the following detailed description by those skilled in the art.

BEST MODE

A low-viscosity liquid epoxy resin composition according to the present invention includes a low-viscosity liquid epoxy resin and a curing agent mixture. Here, a cured product of the low-viscosity liquid epoxy resin composition has physical properties including both a glass transition temperature of 90° C. or higher, as obtained by thermal analysis using a differential scanning calorimeter (DSC), and an elongation of 2% or more, as obtained by evaluation according to ASTM D638.

MODE FOR INVENTION

Hereinafter, the present invention will be described in detail with reference exemplary embodiments thereof. It will become obvious to a person having ordinary skill in the art that these exemplary embodiments are merely provided to describe the present invention in further detail and are not intended to limit the scope of the present invention.

Unless specifically defined otherwise, all the technical and scientific terms used in this specification have the same meanings as what are generally understood by a person skilled in the related art to which the present invention belongs. In general, the nomenclature used in this specification and the experimental methods described below is widely known and generally used in the related art. In the case of conflict, priority will be given to the definitions included in this specification. Also, although similar or equivalent methods and materials to those disclosed in this specification may be used to put the present invention into practice or used for experiments, suitable methods and materials are disclosed in this specification.

A low-viscosity liquid epoxy resin composition according to one aspect of the present invention is characterized by including a low-viscosity liquid epoxy resin and a curing agent mixture. The epoxy resin composition preferably has a mixed viscosity of 1,500 cps or less. When the mixed viscosity of the epoxy resin composition is greater than 1,500 cps, reinforcing fibers are not sufficiently impregnated with the epoxy resin composition upon preparation of a composite material, resulting in degraded physical properties of the composite material. On the other hand, when the mixed viscosity of the epoxy resin composition is less than or equal to 1,500 cps, sufficient mixing may be achieved even in a short stirring time, and workability may be improved.

A matrix resin disclosed in this specification is a polymer resin, and may be, for example, selected from the group consisting of an epoxy resin, a polyester resin, and a vinyl ester resin, and any other polymer resin may be used herein. This specification is described using the epoxy resin as the matrix resin, but the present invention is not limited thereto. Such an epoxy resin may include one or more selected from the group consisting of a bisphenol A-type epoxy, a bisphenol F-type epoxy, a novolac epoxy, a flame-retardant epoxy, a cyclic aliphatic epoxy, and a rubber-modified epoxy.

According to one exemplary embodiment of the present invention, the epoxy resin composition may further include a curing agent mixture. Here, the curing agent mixture is preferably included at 10 to 60 parts by weight, based on 100 parts by weight of the low-viscosity liquid epoxy resin. When the content of the curing agent mixture is less than 10 parts by weight, mechanical strength may be reduced due to a low degree of curing, and when the content of the curing agent mixture is greater than 60 parts by weight, elongation may be lowered and an increase in brittleness may be caused due to a low crosslinking density.

The curing agent mixture is preferably an amine-based curing agent mixture including two or more selected from the group consisting of an aliphatic polyamine, a modified aliphatic polyamine, a cyclic amine, and a secondary or tertiary amine.

Specifically, the curing agent mixture is preferably a mixture of one or more aliphatic amines and one or more cyclic amines. In this case, the aliphatic amines may have a chain structure, thereby imparting elongation to a cured product of the epoxy resin composition, and the cyclic amines may serve to improve a glass transition temperature of the cured product of the epoxy resin composition, thereby improving both the elongation and the glass transition temperature of the epoxy resin composition.

Also, the cured product of the epoxy resin composition according to one exemplary embodiment of the present invention preferably has a glass transition temperature ($T_g$) of 90° C. to 150° C., as obtained by thermal analysis using a differential scanning calorimeter (DSC). In this case, when the glass transition temperature ($T_g$) of the cured product is less than 90° C., safety may be at risk since the pressure vessel may be softened due to heat generated during a charging/discharging cycle. On the other hand, when the glass transition temperature ($T_g$) of the cured product is greater than 150° C., the pressure vessel may be very brittle during a charging/discharging cycle due to high brittleness and low elongation.

Also, the cured product of the epoxy resin composition according to one exemplary embodiment of the present invention preferably has an elongation of 2% to 6%, as obtained by evaluation according to ASTM D638.

The pressure vessel having excellent pressure-resistant characteristics according to another aspect of the present invention is characterized by being manufactured using a composite material obtained by impregnating reinforcing fibers with the above-described epoxy resin composition.

All types of reinforcing fiber that may be used in the related art may be used as the reinforcing fibers, and may also be properly selected and used according to the use thereof. For example, the reinforcing fibers may include one or two or more selected from the group consisting of carbon fibers, glass fibers, aramid fibers, and metal fibers.

Preferably, a carbon fiber tow having a specific gravity of 1.7 to 1.9 may be used. When the specific gravity of the carbon fiber tow is less than 1.7, a number of voids are present in a carbon fiber filament forming the carbon fiber tow, and compactness of the carbon filament may be lowered. Accordingly, a carbon fiber composite material formed using a carbon fiber tow composed of many such carbon fiber filaments may have low compressive strength. Also, when the specific gravity of the carbon fiber tow is greater than 1.9, there is a lower effect of a lightweight carbon fiber composite material being prepared. For this reason, the specific gravity of the carbon fiber tow is more preferably in a range of 1.75 to 1.85.

Also, the number of filaments per carbon fiber tow is preferably in a range of 1,000 to 300,000. When the number of the filaments is less than 1,000, manufacturing costs may increase upon preparation of a carbon fiber composite material due to a low area to volume ratio. On the other hand, when the number of the filaments is greater than 300,000, tensile strength or compressive strength of the prepared carbon fiber composite material may be lowered due to many defects of the filaments per carbon fiber tow.

Further, the pressure vessel manufactured using the composite material obtained by impregnating the reinforcing fibers with the epoxy resin composition according to one exemplary embodiment of the present invention preferably has a burst pressure of 200 bar to 1,000 bar, a value of which satisfies a criterion for inspection under Notification No. 2013-562 of the Ministry of Land, Infrastructure and Transport.

A method of preparing a composite material according to one exemplary embodiment of the present invention includes mechanically mixing an epoxy resin and a curing agent mixture to prepare an epoxy resin composition, and impregnating reinforcing fibers with the epoxy resin composition. A pressure vessel may be manufactured by winding the composite material thus prepared around a liner using a mandrel. The above-described pressure vessel may have excellent pressure-resistant characteristics, and thus may maintain a desirable strength.

Hereinafter, the configurations and consequential effects of the present invention will be described in further detail with reference to examples and comparative examples thereof. However, it should be understood that these examples are merely provided to describe the present invention in further detail, but are not intended to limit the scope of the present invention.

EXAMPLES

Example 1

1-1. Preparation of Epoxy Resin Composition

First, a low-viscosity liquid epoxy resin composition was prepared as follows.

5 parts by weight of a first curing agent (isophorone diamine; Kukdo Chemical Co. Ltd., IPDA) and 20 parts by weight of a second curing agent (polyether diamine; Huntsman Corp., JEFFAMINE D-230) were added to 100 parts by weight of a difunctional epoxy resin (Kumho P&B Chemicals Inc., KER 815).

The mixture was mechanically mixed for 5 minutes using a stirring machine to prepare an epoxy resin composition.

1-2. Preparation of Carbon Fiber Composite Material and Manufacture of Pressure Vessel A carbon fiber tow was impregnated with the epoxy resin composition obtained thus to prepare a carbon fiber composite material. Thereafter, the carbon fiber composite material (Toray T700S) impregnated with the epoxy resin composition was wound around a plastic liner having a capacity of 100 L using a wet filament winder.

A pressure vessel around which the carbon fiber composite material impregnated with the epoxy resin composition was wound was put into a hardening furnace, and the epoxy resin composition was hardened at 110° C. for 2 hours to manufacture a pressure vessel using the epoxy resin composition provided in the present invention.

Example 2

An epoxy resin composition was prepared in the same manner as in Example 1, except that the first and the second curing agents were included in the curing agent mixture at a content of 7.5 parts by weight and 17.5 parts by weight, respectively, based on 100 parts by weight of an epoxy resin. Thereafter, a pressure vessel was manufactured using the epoxy resin composition.

Example 3

An epoxy resin composition was prepared in the same manner as in Example 1, except that the first and the second curing agents were included in the curing agent mixture at a content of 10 parts by weight and 15 parts by weight, respectively, based on 100 parts by weight of an epoxy resin. Thereafter, a pressure vessel was manufactured using the epoxy resin composition.

Example 4

An epoxy resin composition was prepared in the same manner as in Example 1, except that the first and the second curing agents were included in the curing agent mixture at a content of 12.5 parts by weight and 12.5 parts by weight, respectively, based on 100 parts by weight of an epoxy resin. Thereafter, a pressure vessel was manufactured using the epoxy resin composition.

Example 5

An epoxy resin composition was prepared in the same manner as in Example 1, except that the first and the second curing agents were included in the curing agent mixture at a content of 15 parts by weight and 10 parts by weight, respectively, based on 100 parts by weight of an epoxy resin. Thereafter, a pressure vessel was manufactured using the epoxy resin composition.

Example 6

An epoxy resin composition was prepared in the same manner as in Example 1, except that the first and the second curing agents were included in the curing agent mixture at a content of 17.5 parts by weight and 7.5 parts by weight, respectively, based on 100 parts by weight of an epoxy resin. Thereafter, a pressure vessel was manufactured using the epoxy resin composition.

Example 7

An epoxy resin composition was prepared in the same manner as in Example 1, except that the first and the second curing agents were included in the curing agent mixture at a content of 20 parts by weight and 5 parts by weight, respectively, based on 100 parts by weight of an epoxy resin. Thereafter, a pressure vessel was manufactured using the epoxy resin composition.

Example 8

An epoxy resin composition was prepared in the same manner as in Example 1, except that the first and the second curing agents were included in the curing agent mixture at a content of 9 parts by weight and 6 parts by weight, respectively, based on 100 parts by weight of an epoxy resin. Thereafter, a pressure vessel was manufactured using the epoxy resin composition.

Example 9

An epoxy resin composition was prepared in the same manner as in Example 1, except that the first and the second curing agents were included in the curing agent mixture at a content of 12 parts by weight and 8 parts by weight, respectively, based on 100 parts by weight of an epoxy resin. Thereafter, a pressure vessel was manufactured using the epoxy resin composition.

Example 10

An epoxy resin composition was prepared in the same manner as in Example 1, except that the first and the second curing agents were included in the curing agent mixture at a content of 18 parts by weight and 12 parts by weight, respectively, based on 100 parts by weight of an epoxy resin. Thereafter, a pressure vessel was manufactured using the epoxy resin composition.

Example 11

An epoxy resin composition was prepared in the same manner as in Example 1, except that the first and the second curing agents were included in the curing agent mixture at a content of 21 parts by weight and 14 parts by weight, respectively, based on 100 parts by weight of an epoxy resin. Thereafter, a pressure vessel was manufactured using the epoxy resin composition.

Example 12

An epoxy resin composition was prepared in the same manner as in Example 1, except that the first and the second curing agents were included in the curing agent mixture at a content of 24 parts by weight and 16 parts by weight, respectively, based on 100 parts by weight of an epoxy resin. Thereafter, a pressure vessel was manufactured using the epoxy resin composition.

COMPARATIVE EXAMPLES

Comparative Example 1

A low-viscosity liquid epoxy resin composition including one curing agent was prepared as follows.

25 parts by weight of a curing agent (isophorone diamine; Kukdo Chemical Co. Ltd., IPDA) was added to 100 parts by weight of a difunctional epoxy resin (Kumho P&B Chemicals Inc., KER 815).

The mixture was mechanically mixed for 5 minutes using a stirring machine to prepare an epoxy resin composition, and a pressure vessel was then manufactured in the same manner as in Example 1.

Comparative Example 2

25 parts by weight of a curing agent (Polyether diamine; Huntsman Corp., JEFFAMINE D-230) was added to 100 parts by weight of a difunctional epoxy resin (Kumho P&B Chemicals Inc., KER 815) to prepare an epoxy resin composition, and a pressure vessel was then manufactured in the same manner as in Comparative Example 1.

The components and contents (parts by weight) included in the epoxy resin compositions prepared in Examples 1 to 12 and Comparative Examples 1 to 2 are listed in the following Table 1.

TABLE 1

| Items | Difunctional epoxy resin | First agent | Second curing agent |
|---|---|---|---|
| Comparative Example 1 | 100 | 25 | — |
| Comparative Example 2 | 100 | — | 25 |
| Example 1 | 100 | 5 | 20 |
| Example 2 | 100 | 7.5 | 17.5 |
| Example 3 | 100 | 10 | 15 |
| Example 4 | 100 | 12.5 | 12.5 |
| Example 5 | 100 | 15 | 10 |
| Example 6 | 100 | 17.5 | 7.5 |
| Example 7 | 100 | 20 | 5 |
| Example 8 | 100 | 9 | 6 |
| Example 9 | 100 | 12 | 8 |
| Example 10 | 100 | 18 | 12 |
| Example 11 | 100 | 21 | 14 |
| Example 12 | 100 | 24 | 16 |

The physical properties of the epoxy resin compositions and the pressure vessels obtained in Examples 1 to 12 and Comparative Examples 1 to 2 were measured in the following experimental examples. The results are listed in the following Table 2.

EXPERIMENTAL EXAMPLES

<Experimental Example 1> Measurement of Mixed Viscosity of Epoxy Resin Composition For mixed viscosity measurement, the mixed viscosities of the epoxy resin compositions prepared in Examples 1 to 12 and Comparative Examples 1 and 2 were measured at room temperature and a rotary speed of 3.0 rpm with a Brookfield LVDV-I+ viscometer using a #62 spindle.

<Experimental Example 2> Measurement of Glass Transition Temperature of Epoxy Resin Composition To prepare a test sample for measurement of the glass transition temperature, the epoxy resin compositions prepared in Examples 1 to 12 and Comparative Examples 1 and 2 were hardened at 110° C. for 2 hours in an oven. The glass transition temperatures (° C.) of the resulting test samples were measured at a heating rate of 5° C./min using a differential scanning calorimeter (DSC).

<Experimental Example 3> Measurement of Mechanical Physical Properties of Epoxy Resin Composition: Tensile Strength and Elongation To manufacture a test sample for measurement of the tensile strength, each of the epoxy resin compositions prepared in Examples 1 to 12 and Comparative Examples 1 and 2 was injected into a dog bone-shaped mold, and hardened at 110° C. for 2 hours in an oven.

A tensile test was carried out according to the ASTM D638 standard using Instron Model 8501 UTM. A load cell having the maximum load of 10 ton was used, and a test was carried out at a constant crosshead speed of 0.05 mm/min in the tensile test.

<Experimental Example 4> Measurement of Burst Pressure of Pressure Vessel

To measure the burst pressures of the pressure vessels manufactured in Examples 1 to 12 and Comparative Examples 1 and 2, evaluations were performed according to the criteria of Notification No. 2013-562 of the Ministry of Land, Infrastructure and Transport. A high-pressure water pump was connected to each of the hardened pressure vessels and a pressure in each of the pressure vessels was increased, and the pressure at which each of the pressure vessels burst was recorded.

TABLE 2

| Items | Mixed viscosity (cps) | Glass transition temperature (° C.) | Tensile strength (MPa) | Elongation (%) | Burst pressure (bar) |
|---|---|---|---|---|---|
| Comparative Example 1 | 410 | 153 | 112.8 | 1.5 | 189 |
| Comparative Example 2 | 980 | 78 | 46.5 | 5.8 | 503 |
| Example 1 | 970 | 91 | 59.6 | 5.5 | 621 |
| Example 2 | 840 | 98 | 65.6 | 5.2 | 755 |
| Example 3 | 720 | 102 | 68.7 | 4.9 | 796 |
| Example 4 | 570 | 105 | 71.3 | 4.6 | 830 |
| Example 5 | 490 | 112 | 75.2 | 4.4 | 986 |
| Example 6 | 450 | 115 | 79.8 | 3.8 | 811 |
| Example 7 | 420 | 121 | 83.4 | 2.9 | 479 |
| Example 8 | 1,480 | 92 | 51.2 | 5.9 | 583 |
| Example 9 | 1,020 | 96 | 62.7 | 5.7 | 737 |
| Example 10 | 380 | 125 | 88.6 | 3.3 | 534 |
| Example 11 | 290 | 139 | 96.1 | 2.6 | 429 |
| Example 12 | 230 | 148 | 107.3 | 2.1 | 212 |

As listed in Table 2, it can be seen that the epoxy resin compositions including either the aromatic amine-based curing agent or the aliphatic amine-based curing agent (Comparative Examples 1 and 2) had one high physical property, for example, either a high elongation or a high glass transition temperature.

On the other hand, it can be seen that, when the low-viscosity liquid epoxy resin compositions according to one exemplary embodiment of the present invention included the curing agent mixture at 25 parts by weight, based on 100 parts by weight of the epoxy resin (Examples 1 to 7), the glass transition temperature and tensile strength were enhanced and the elongation was reduced as the content of the aromatic amine-based curing agent increased. Also, it can be seen that, when the aromatic amine-based and aliphatic amine-based curing agents were included at a ratio of 60 parts by weight and 40 parts by weight, respectively (Examples 8 to 12), the glass transition temperature and tensile strength were enhanced and the elongation was reduced as the content of the curing agent mixture increased.

It is believed that the motility of epoxy resin molecules is restricted as a cyclic molecular structure increases, thereby enhancing the glass transition temperature and tensile strength of the epoxy resin composition and reducing the elongation of the epoxy resin composition.

Also, the pressure vessel manufactured using the low-viscosity liquid epoxy resin composition according to one exemplary embodiment of the present invention had the maximum burst pressure in the case of Example 5. In this case, it is judged that the low-viscosity liquid epoxy resin composition had both excellent elongation and an excellent glass transition temperature, and thus was applicable to pressure vessels for compressed hydrogen gas.

The present invention has been described in detail. However, it should be understood that the detailed description and specific examples, while indicating preferred embodiments of the invention, are given by way of illustration only, and various changes and modifications within the spirit and scope of the invention will become apparent to those skilled in the art from this detailed description.

What is claimed is:

1. A pressure vessel comprising a composite comprising reinforcing carbon fiber tow impregnated with a low-viscosity liquid epoxy resin,
    wherein the carbon fiber tow has a specific gravity of 1.7 to 1.9;
    wherein the carbon fiber tow comprises filaments in the range of 1,000 to 300,000 filaments per carbon fiber tow;
    wherein the low-viscosity liquid epoxy resin composition has a mixed viscosity of 1,500 cps or less and comprises a low-viscosity liquid epoxy resin and a curing agent mixture;
    wherein the curing agent mixture is a mixture of isophorone diamine and polyether diamine in a ratio of 1:0.25 to 1:4 by weight;
    wherein the curing agent mixture is present at a content of 10 to 40 parts by weight, based on 100 parts by weight of the low-viscosity liquid epoxy resin;
    wherein a cured product of the low-viscosity liquid epoxy resin composition has a glass transition temperature of 90° C. to 150° C., as obtained by thermal analysis using a differential scanning calorimeter (DSC), and an elongation of 2% or more, as obtained by evaluation according to ASTM D638; and,
    wherein the pressure vessel has a burst pressure of 200 bar to 1,000 bar.

2. The pressure vessel of claim 1, wherein the low-viscosity epoxy resin composition comprises 5 parts by weight of the isophorone diamine and 20 parts by weight of a polyether diamine per 100 parts low-viscosity liquid epoxy resin.

3. The pressure vessel of claim 1, wherein the low-viscosity epoxy resin composition comprises 7.5 parts by weight of the isophorone diamine and 17.5 parts by weight of a polyether diamine per 100 parts low-viscosity liquid epoxy resin.

4. The pressure vessel of claim 1, wherein the low-viscosity epoxy resin composition comprises 10 parts by weight of the isophorone diamine and 15 parts by weight of a polyether diamine per 100 parts low-viscosity liquid epoxy resin.

5. The pressure vessel of claim 1, wherein the low-viscosity epoxy resin composition comprises 12.5 parts by weight of the isophorone diamine and 12.5 parts by weight of a polyether diamine per 100 parts low-viscosity liquid epoxy resin.

6. The pressure vessel of claim 1, wherein the low-viscosity epoxy resin composition comprises 15 parts by weight of the isophorone diamine and 10 parts by weight of a polyether diamine per 100 parts low-viscosity liquid epoxy resin.

7. The pressure vessel of claim 1, wherein the low-viscosity epoxy resin composition comprises 17.5 parts by weight of the isophorone diamine and 7.5 parts by weight of a polyether diamine per 100 parts low-viscosity liquid epoxy resin.

8. The pressure vessel of claim 1, wherein the low-viscosity epoxy resin composition comprises 20 parts by weight of the isophorone diamine and 5 parts by weight of a polyether diamine per 100 parts low-viscosity liquid epoxy resin.

9. The pressure vessel of claim 1, wherein the low-viscosity epoxy resin composition comprises 9 parts by weight of the isophorone diamine and 6 parts by weight of a polyether diamine per 100 parts low-viscosity liquid epoxy resin.

10. The pressure vessel of claim 1, wherein the low-viscosity epoxy resin composition comprises 12 parts by weight of the isophorone diamine and 8 parts by weight of a polyether diamine per 100 parts low-viscosity liquid epoxy resin.

11. The pressure vessel of claim 1, wherein the low-viscosity epoxy resin composition comprises 18 parts by weight of the isophorone diamine and 12 parts by weight of a polyether diamine per 100 parts low-viscosity liquid epoxy resin.

12. The pressure vessel of claim 1, wherein the low-viscosity epoxy resin composition comprises 21 parts by weight of the isophorone diamine and 14 parts by weight of a polyether diamine per 100 parts low-viscosity liquid epoxy resin.

13. The pressure vessel of claim 1, wherein the low-viscosity epoxy resin composition comprises 24 parts by weight of the isophorone diamine and 16 parts by weight of a polyether diamine per 100 parts low-viscosity liquid epoxy resin.

* * * * *